US009558023B2

(12) United States Patent
Barrat et al.

(10) Patent No.: US 9,558,023 B2
(45) Date of Patent: *Jan. 31, 2017

(54) LIVE APPLICATION MOBILITY FROM ONE OPERATING SYSTEM LEVEL TO AN UPDATED OPERATING SYSTEM LEVEL AND APPLYING OVERLAY FILES TO THE UPDATED OPERATING SYSTEM

(71) Applicant: International Business Machines Corporation, Armonk, NY (US)

(72) Inventors: Frederic Barrat, Cugnaux (FR); Christine M. Briand; Laurent Dufour, Plaisance du Touch (FR); Khalid Filali-Adib, Austin, TX (US); Perinkulam I. Ganesh, Round Rock, TX (US); J. Mark McConaughy, Austin, TX (US); Stephen B. Peckham, Austin, TX (US); David W. Sheffield, Austin, TX (US); Marc J. Stephenson, Austin, TX (US); Nathaniel S. Tomsic, Austin, TX (US); Sungjin Yook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/077,290

(22) Filed: Nov. 12, 2013

(65) Prior Publication Data
US 2014/0331228 A1 Nov. 6, 2014

Related U.S. Application Data

(63) Continuation of application No. 13/874,521, filed on May 1, 2013.

(51) Int. Cl.
*G06F 9/455* (2006.01)
*G06F 9/46* (2006.01)
(Continued)

(52) U.S. Cl.
CPC ............ *G06F 9/45533* (2013.01); *G06F 8/67* (2013.01); *G06F 9/45558* (2013.01); *G06F 9/46* (2013.01);
(Continued)

(58) Field of Classification Search
None
See application file for complete search history.

(56) References Cited

U.S. PATENT DOCUMENTS 6,530,078 B1 * 3/2003 Shmid et al. ................. 717/138
7,506,037 B1 3/2009 Ciano et al.
(Continued)

OTHER PUBLICATIONS

Kivity et al ("The Linux Virtual Machine Monitor", Proceedings of the Linux Symposium, pp. 225-230,Jun. 27-30, 2007, Ottawa, Ontario, Canada).

*Primary Examiner* — Mengyao Zhe
*Assistant Examiner* — Michael Ayers
(74) *Attorney, Agent, or Firm* — Thomas E. Tyson; Gregory K. Goshorn; Greg Goshorn, P.C.

(57) ABSTRACT

Provided are techniques for comparing a first fileset associated with a first operating system (OS) with a second fileset associated with a second OS; determining, based upon the comparing, that the second OS is a more current version of the first OS; in response to the determining that the second OS is a more current version of the first OS, moving, in conjunction with live application mobility, a virtual machine (VM) workload partition (WPAR) on the first LPAR to a second LPAR, the moving comprising determining a set of overlays associated with the WPAR corresponding to the second OS; removing from the WPAR
(Continued)

any overlays associated with the first OS; applying to the WPAR a set of overlays corresponding to the second OS; check pointing processes associated with the WAPR; and copying live data associated with the LPAR from the first LPAR to the second LPAR.

6 Claims, 6 Drawing Sheets

(51) Int. Cl.
*G06F 11/07* (2006.01)
*G06F 9/48* (2006.01)
*G06F 9/445* (2006.01)

(52) U.S. Cl.
CPC ............ *G06F 9/4856* (2013.01); *G06F 11/07* (2013.01); *G06F 2009/4557* (2013.01)

(56) References Cited

U.S. PATENT DOCUMENTS

| | | |
|---|---|---|
| 7,941,510 B1 * | 5/2011 | Tormasov et al. ............ 709/220 |
| 8,185,893 B2 | 5/2012 | Hyser et al. |
| 2009/0217267 A1 | 8/2009 | Gebhart et al. |
| 2009/0260000 A1 * | 10/2009 | Pilant et al. .................. 717/170 |
| 2012/0011513 A1 * | 1/2012 | McConaughy et al. ...... 718/100 |
| 2012/0066555 A1 * | 3/2012 | Ganesh et al. .................. 714/49 |

\* cited by examiner

LIVE APPLICATION MOBILITY FROM ONE OPERATING SYSTEM LEVEL TO AN UPDATED OPERATING SYSTEM LEVEL AND APPLYING OVERLAY FILES TO THE UPDATED OPERATING SYSTEM

CROSS REFERENCES TO RELATED APPLICATIONS

The present application is a continuation and claims the benefit of the filing date of an application entitled, "Live Application Mobility From One Operating System Level To An Updated Operating System Level" Ser. No. 13/874,521, filed May 1, 2013, assigned to the assignee of the present application and herein incorporated by reference.

FIELD OF DISCLOSURE

The claimed subject matter relates generally to computing systems and, more specifically, to techniques for moving a workload partition from a logical partition with a particular operating system to a second partition with an updated version of the particular operating system.

BACKGROUND OF THE INVENTION

Unlike logical partitions LPAR s), in which computing resources are partitioned with respect to hardware, a virtualized file system is partitioned with respect to software. In addition, although LPARs which may have different operating systems, virtualized file system spaces typically include virtualized operating system (OS) environments within a single instance of an OS, an example of a virtualized file system space, used as an example throughout this Specification, is a workload partition (WPAR). It should be understood that although the claimed subject matter is described with respect to WPARs, the same principles also apply to other types of virtualized file system spaces.

Basically, there are two types of WPARs, system WPARs and application WPARs. Typically, a system WPAR partitions system resources and an application WPAR isolates and executes one or more application processes. The following description is based upon system WPARs. Each WPAR has a regulated share of system resources and may have unique networks and file systems. In addition, each WPAR may have separate administrative and security domains, with each WPAR having a unique root user, regular users and passwords, its own services such as inetd, cron and syslog, and can be stopped and started on its own. A WPAR does not typically share writable file systems with other WPARs or the global system. WPARs share an operating system and may share underlying file systems, real or virtual disk adapters, processors, memory, paging space and a real or virtual network card.

Although WPARs with in a particular LPAR share one OS, different WPARs within a LPAR may run different versions of a particular OS. Such a WPAR is called a "versioned" WPAR. A versioned WPAR typically runs an older version of an OS than the global LPAR. The versioned WPAR contains commands, shared libraries, and so on of whatever level of OS it is running. However some commands, such as, but not limited to, device drivers and other kernel extensions, within a versioned WPAR are "overlaid," which means that the WPAR runs the corresponding command in the global LPAR. Typically, this is necessary to keep certain commands in sync with the kernel on the global LPAR because WPARs do not include their own kernel.

When a file is overlaid, the file is renamed, typically by adding a suffix to the name and the original file, or legacy binary, is replaced by a symbolic link to a copy of the native runtime execution wrapper. Typically, there is one copy of the native execution wrapper for each target binary's directory path. In addition, actions are taken to reflect these changes in data that an install facility use to track the state of all installed files on the system and references to the original name are replaced by the new name with the added suffix. The wrapper mechanism works as follows: 1) The path of the native library is pre-pended to the LIBPATH parameter; 2) The name of the executable that invoked the wrapper is identified; and 3) A special new "native runtime exec( ) interface" is called to execute the corresponding native binary.

SUMMARY

As the Inventors herein have realized, typically, moving a workload partition to a new logical partition requires that all running applications be stopped and restarted. Provided are techniques for moving a workload partition from a logical partition with a particular operating system to a second partition with an updated version of the particular operating system. In accordance with the disclosed technology, running programs may be moved to a more current OS without stopping and restarting, the programs.

Provided are techniques for comparing a first fileset associated with a first operating system (OS) with a second fileset associated with a second OS; determining, used upon the comparing, that the second OS is a more current version of the first OS; in response to the determining that the second OS is a more current version of the first OS, moving, in conjunction with live application mobility, a virtual machine (VM) workload partition (WPAR) on the first LPAR to a second LPAR, the moving comprising determining a set of overlays associated with the WPAR corresponding to the second OS; removing from the WPAR any overlays associated with the first OS; applying to the WPAR a set of overlays corresponding to the second OS; check pointing processes associated with the WAPR; and copying live data associated with the from the first LPAR to the second LPAR.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following, detailed description of the disclosed embodiments is considered in conjunction with the following figures.

DETAILED DESCRIPTION

Figure 1:
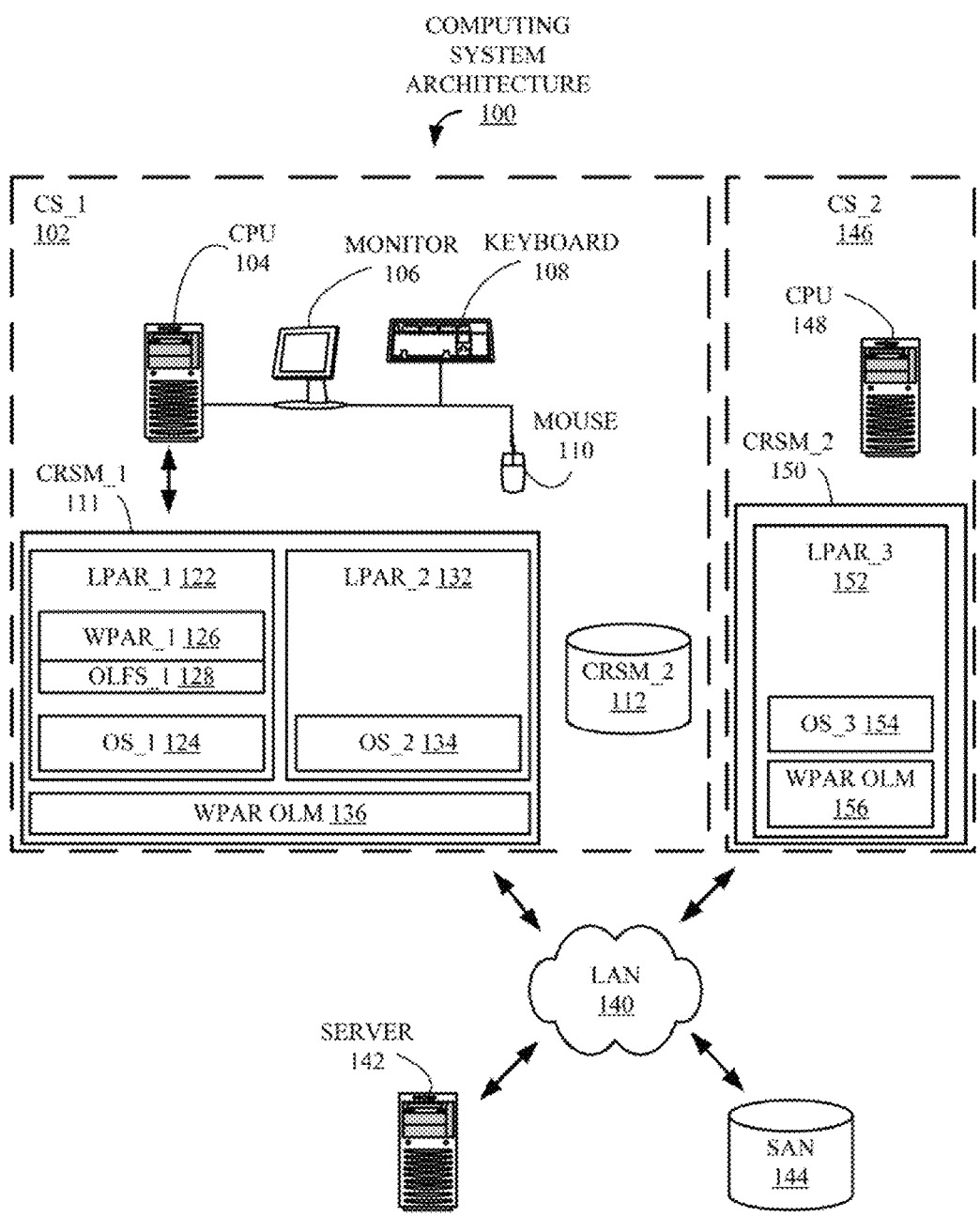
FIG. 1 is a block diagram of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks. It should also be understood that, although described with respect to WPARs, the claimed subject matter is equally applicable to other types of virtualized file system spaces.

Turning now to the figures, FIG. 1 is a block diagram of one example of a computing system architecture 100 that may incorporate the claimed subject matter. A first computing system (CS_1) 102 includes a central processing unit (CPU) 104, coupled to a monitor 106, a keyboard 108 and a pointing device, or "mouse," 110, which together facilitate human interaction with other elements of architecture 100 and computing system 102. Also included in computing system 102 and attached to CPU 104 are computer-readable storage mediums (CRSMs), specifically a CRSM_1 111 and a CRSM_2 112. Each of CRSMs 111-112 may either be incorporated into computing system 102, i.e. an internal device, or attached externally to CPU 104 by means of various, commonly available connection devices such as but not limited to, a universal serial bus (USB) port (not shown).

CRSM_1 111 is illustrated storing two (2) logical partitions (LPARs), i.e. an LPAR_1 122 and an LPAR_2 132. LPAR_1 122 is illustrated with a workload partition (WPAR), i.e., a WPAR_1 126, and an operating system (OS), i.e. OS_1 124. WPAR_1 126 includes a overlaid file system, i.e. an OLFS_1 128 LPAR_2 132 is illustrated with an operating system, OS_2 134. In the following examples, OS_1 124 is an older version of OS_2 134. Also stored on CRSM_1 111 for execution on one or more processors (not shown) of computing system 102 is an WPAR Overlay Manager (OLM) 136. In the following examples, WPAR OLM 136 is configured to implement the claimed subject matter.

CS_1 102 is coupled to a local area network (LAN) 140, which provided connectivity among a server computer, or simply "server," 142, a storage area network (SAN) 144 and a second computing system (CS_2) 146. Although in this example, computing system 102, server 142, SAN 144 and CS_2 146 are communicatively coupled via LAN 140, they could also be coupled through any number of communication mediums such as, but not limited to, direct connections, a wide area network (WAN) and the Internet (none of which are shown). Like CS_1 102, CS_2 146 includes a CPU, i.e. CPU 148, and a CRSM, i.e., CRSM 150. CRSM 150 is illustrating storing a logical partition, i.e., LPAR_3 152, which includes and an operating system, i.e., OS_3 154, and a WPAR OLM, i.e., WPAR OLM 156. Although not shown for the sake of simplicity, CS_2 146 would typically include a monitor, a keyboard and a mouse. Like OS_2 134, OS_3 154 is a more current version of operating system than OS_1 124. In the following examples, the disclosed technology describes how WPAR_1 126 may be migrated from LPAR_1 122 and OS_1 124 on CS_1 102 to LPAR_3 152 and OS_3 154 on CS_2 146 (see 200, FIG. 3, 240, FIG. 4, 270, FIG. 5 and 300, FIG. 6). As explained above, WPAR_1 126, once migrated, is a versioned WPARs, i.e., running a less current version of an OS than the LPAR on which it is installed.

Computing devices 142 and 144 are used as examples of resources that may be available to computing system 102 and serve as potential access points and storage devices for computing system 102. It should be understood that although illustrated only on two computing systems and CRSMs, LPARs 122, 132 and 154. WPAR 126 and WPAR OLMs 136 and 156 may reside on different CRSMs and even different computing systems such as CRSMs 112 and 113, server 142 and CS_2 146. It also should be noted that typical architectures and computing system would typically include many addition elements, but for the sake of simplicity only a few are shown.

Figure 2:
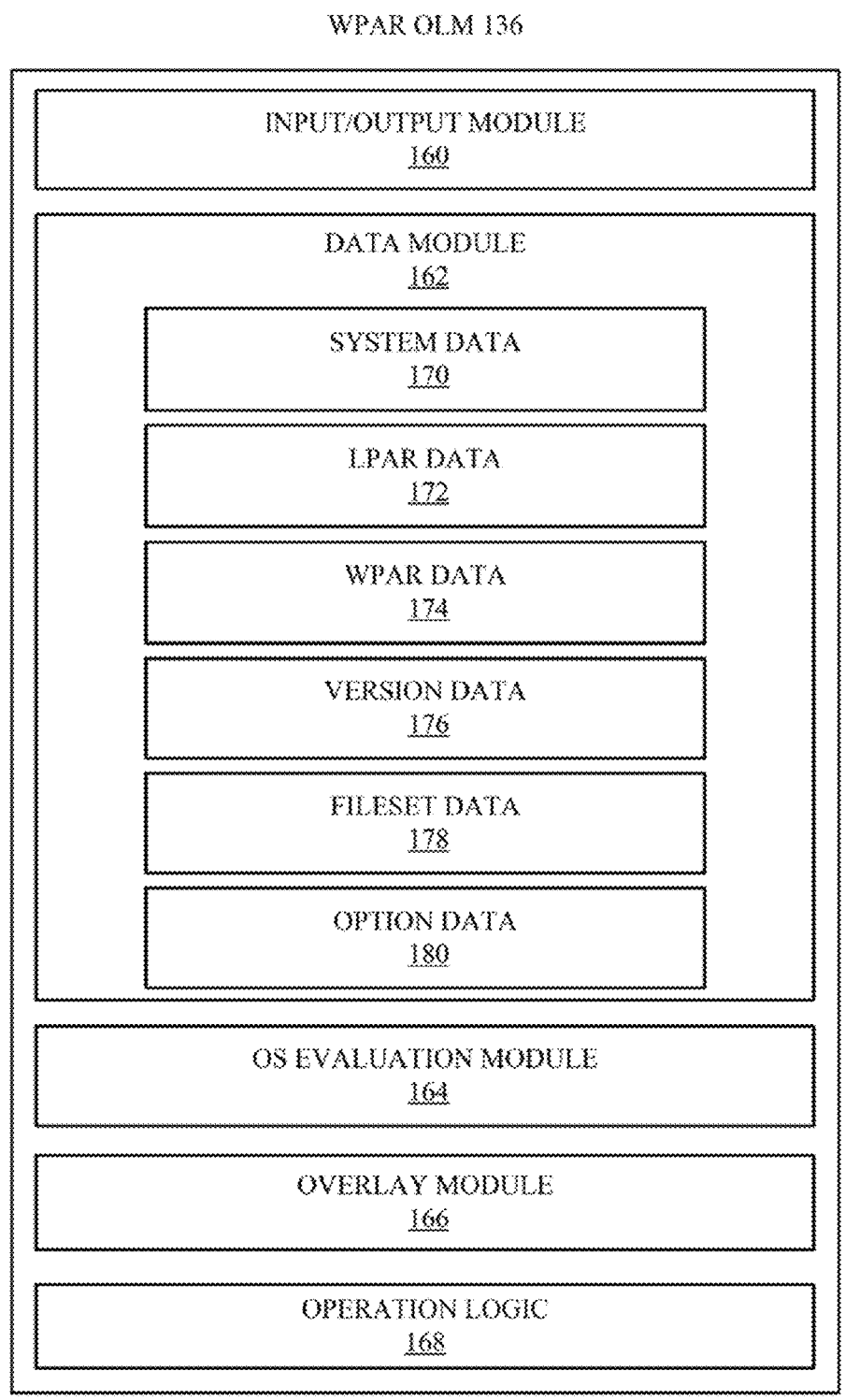
FIG. 2 is a block diagram of a workload partition (WPAR) Overlay Manager (OLM), introduced above in FIG. 1, in greater detail.

FIG. 2 is a block diagram of WPAR OLM 136, introduced above in FIG. 1, in greater detail. WPAR OLM 136 includes an input/output (I/O) module 160, a data module 162, an OS evaluation module 164, an overlay module 166 and operation logic 168. Although there may be other components of WPAR OLM 136, for the sake of simplicity, only components 160, 162, 164, 166 and 168 are illustrated and described. For the sake of the following examples, logic associated with WPAR OLMs 136 and 156 are assumed to execute on one or more processors (not shown) of computing systems 102 and 146 (FIG. 1), respectively, and to be stored an CRSMs 111 and 150 (FIG. 1), respectively. It should be understood that the claimed subject matter can be implemented in many types of computing systems and data storage structures but, for the sake of simplicity, is described only in terms of CS_1 102 (FIG. 1), CS_2 146 and system architecture 100 (FIG. 1). Further, the representation of WPAR OLM 136 in FIG. 2 is a logical model. In other words, components 160, 162, 164, 166 and 168 may be stored in the same or separates files and loaded and/or executed within computing system 102 and architecture 109 either as a single system or as separate processes interacting via any available inter process communication (IPC) techniques.

I/O module 160 handles any communication WPAR OLM 136 has with other components of computing system 102, architecture 190 and any administrator or user. Data module 162 is a data repository for information and parameters that WPAR OLM 136 requires during operation. Examples of the types of information stored in data module 162 include system data 170, LPAR data 172, WPAR data 174, version data 176, fileset data 178 and option data 180.

System data 170 stores information relating to other elements of architecture 100, such as but not limited to, server 142 (FIG. 1), SAN 144 (FIG. 1) and CS_2 146 (FIG. 1). In short, system data 160 stores information that enables, among other things, WPAR OLE 136 to communicate with WPAR OLE 156 executing on CS_2 146 to implement aspects of the claimed subject matter. LPAR data 172 stores information relating to established LPARs such as LPAR_1 122 (FIG. 1) and LPAR_2 132 (FIG. 1), including, but not limited to, information on the particular OS running on each. WPAR data 174 stores information relating to established WPARs such as WPAR 122, including, but not limited to, various resources that may be allocated to WPAR 126. Version data 176 stores information on the specific version of OSs 124 and 134 that each of LPARs 132 and 122 is currently executing. Fileset data 178 stores information about the filesets installed in each of WPAR 126 as well as the specific filesets that have been overlaid in accordance with the claimed subject matter. Option data 180 stores user and administrative operating parameters that may control the operation of WPAR OLM 136.

Figure 3:
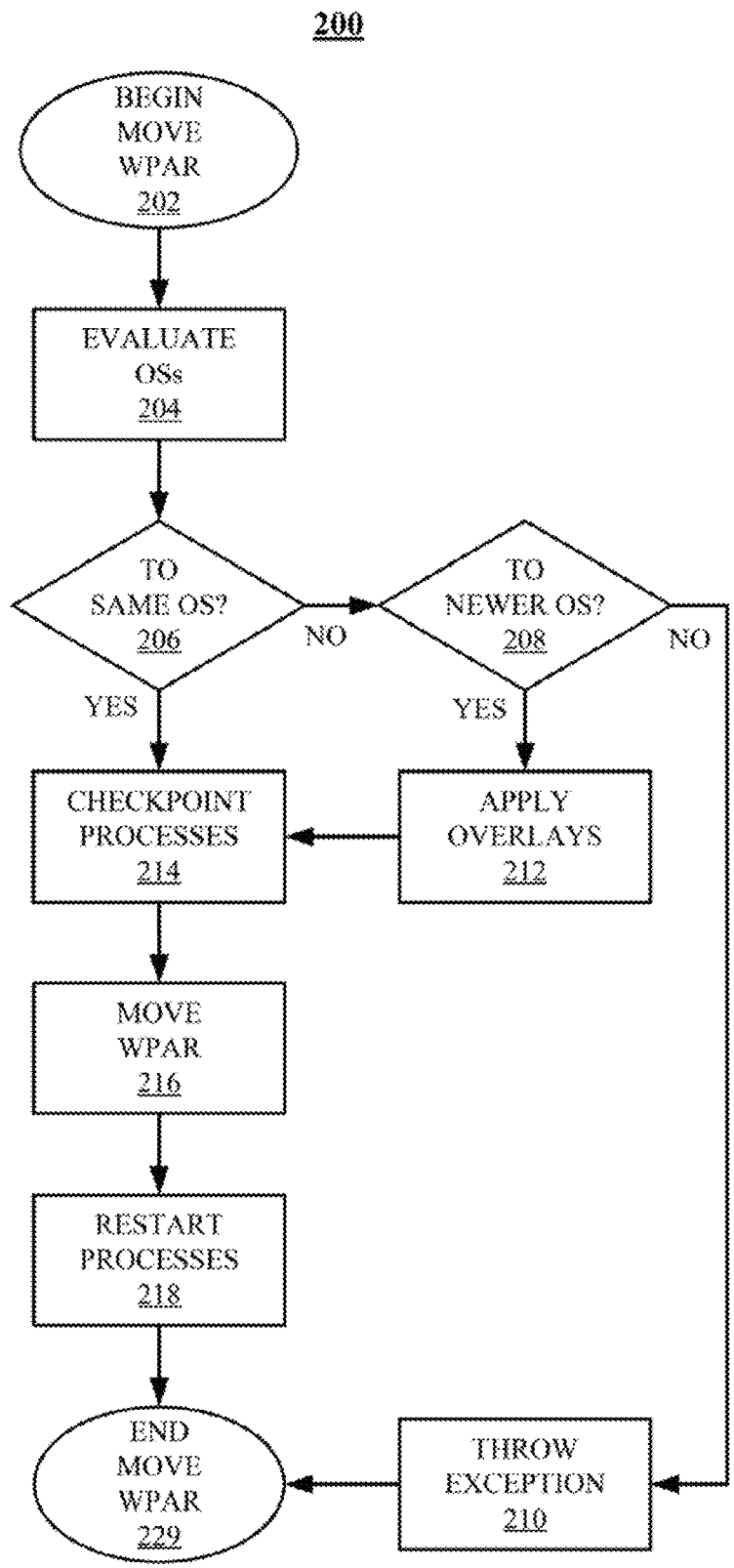
FIG. 3 is a flowchart of one example of a Compare Operating Systems (OSs) process that may implement aspects of the claimed subject matter.
Figure 4:
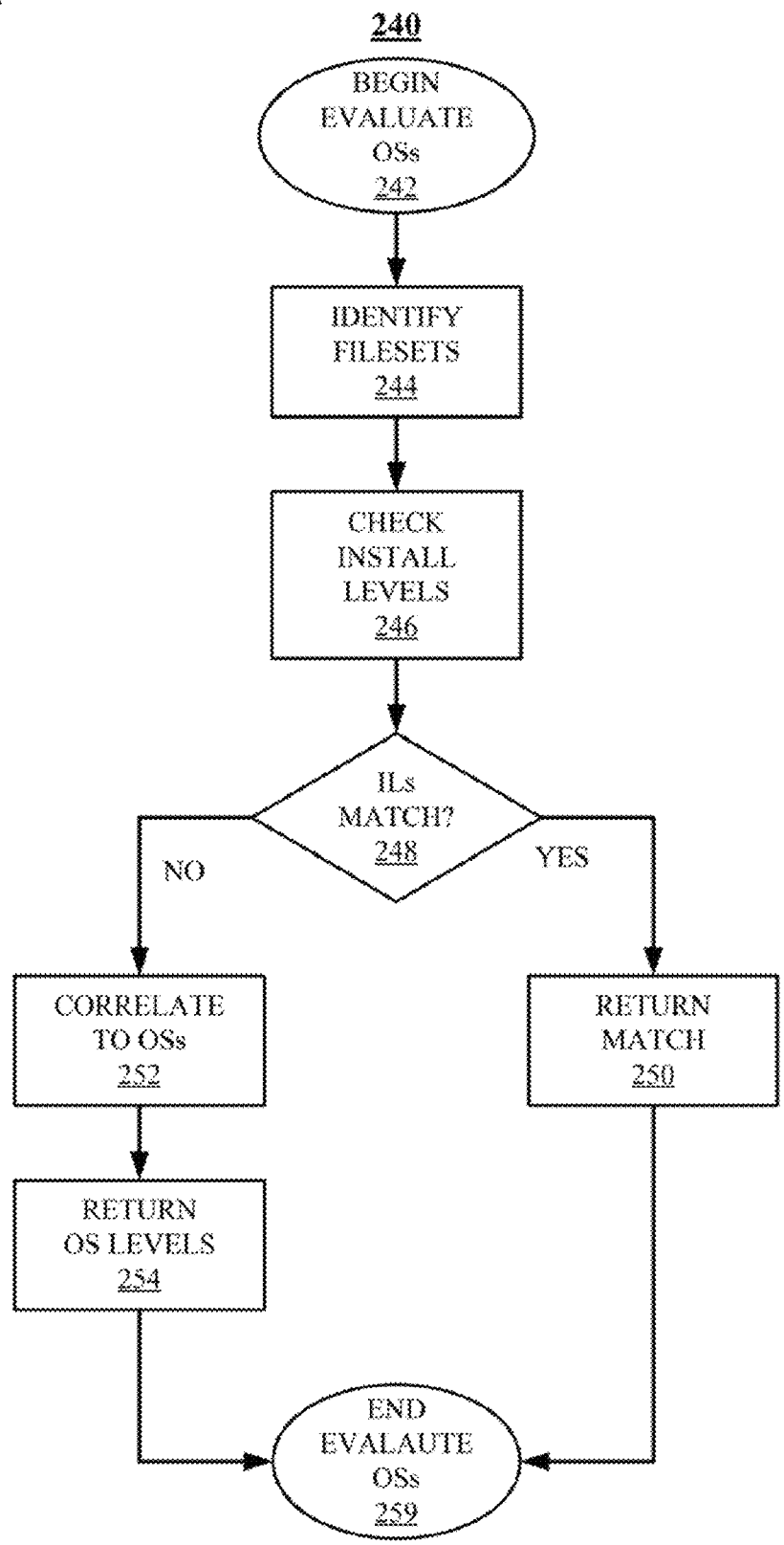
FIG. 4 is a flowchart of one example of an Evaluate Operating Systems (OSs) process that may implement aspects of the claimed subject matter.

OS evaluation module 164 is associated with logic for comparing operating system such as OSs 124, 134 and 154 are earlier, the same or more current versions of each other (see 240, FIG. 4). Overlay module 166 stores logic responsible for installing the appropriate filesets in versioned WPARs such as WPARs 126 and 134 in accordance with the claimed subject matter. Operation logic 168 stores logic associated with implementation of the claimed subject matter as well as logic responsible for the typical logic associated with the installation and updating of WPARs such as WPARs 126 and 127. Components 152, 154, 156, 160, 162, 164, 166 and 168, which would have corresponding structures in WPAR OLM 156 (FIG. 1) are described in more detail below in conjunction with FIGS. 3-6.

FIG. 3 is a flowchart of one example of a Move WPAR process 200 that may implement aspects of the claimed subject matter. In this example, process 200 is associated with logic stored on CRSM_1 111 (FIG. 1) in conjunction with WPAR OLM 136 (FIGS. 1 and 2) and executed on one or more processors (not shown) of CPU 104 (FIG. 1) of computing system 102 (FIG. 1). In the following example, WPAR_1 126 (FIG. 1) is moved from LPAR_1 122 (FIG. 1), which is referred to as the "departure" LPAR and is running on OS_1 124 (FIG. 1), to LPAR_3 152 (FIG. 1) on CS_2 146 (FIG. 1), which referred to as the "arrival" LPAR and is running OS_3 154 (FIG. 1), a more current version OS than OS_1 124.

Process 200 begins in a "Begin Move WPAR" block 202 and proceeds immediately to an "Evaluate OSs" block 204. During processing associated with block 204, a determination is made as to the specific versions of the OS_1 124, from which WPAR_1 126 is being moved, and OS_3 154, to which WPAR_1 126 is being moved (see 240, FIG. 4). Such a determination may be based upon information stored in conjunction with WPAR OLM 136 (see 162, FIG. 2) and a comparison of filesets that are typically installed in specific operating systems (see 240, FIG. 4). During processing associated with a "To Same OS?" block 206, a determination is made as to whether or not OS_3 154 is the same version as OS_1 124. If not, control proceeds to a "To Newer OS?" block 208. During processing associated with block 208, a determination is made as to whether or not OS_3 154 is a more current version of OS_1 124. If not, control proceeds to a "Throw Exception" block 210. The disclosed techniques apply to moving a WPAR of a newer OS so during processing associated with block 210 actions are taken to notify the user or administrator that the move is not being implemented.

If, during processing associated with block 298, a determination is made that OS_3 154 is a more current version of OS_1 124, control proceeds to an "Apply Overlays" block 212. During processing associated with block 212, OLFS 128 (FIG. 1) is generated and added to WPAR_1 126 (see 270, FIG. 5). In short, during processing associated with block 212, files, registers and parameters associated with WPAR_1 126, including any files that have been overlaid, are migrated to LPAR_3 152 in accordance with know or yet to be developed migration procedures, typically via LAN 140.

During processing associated with a "Checkpoint Processes" block 214, all running processes within WPAR_1 126 are halted in anticipation of the move. While hatted, application data such as open files, memory content and so on are captured and transferred to the arrival LPAR. This provides a window of opportunity when none of the processes of the WPAR are running, thus the overlays and update may take place because there is no current updating of software vital product data (SWVPD). File systems of the WPAR are still accessible from the departure side so overlays can be applied during this time period. Essentially, the timing enables overlays to be applied in an atomic manner relative to any other activity on the system.

During processing associated with a "Move WPAR" block 216. WPAR_1 126 is copied from LPAR_1 122 and CS_1 102 to LPAR_3 152 and CS_2 146. In short, live data associated with WPAR_1 126 is captured in LPAR_1 122 and transferred to LAPR_3 152 via LAN 140. In this example, files associated with WPAR_1 126 reside on SAN 144, which is shared by CS_1 102 and CS_2 146, and are accessed by LPAR_3 152 as they were by LPAR_1 122 before the move. During processing associated with a "Restart Processes" block 218, all processes of WPAR 126 that were halted during processing associated with block 214 are restarted and WPAR_1 126 is up and running on LPAR_3 152 and CS_2 146. Once processes have been restarted on the arrival side and begin accessing the file systems, OLFS 128 is in place during processing associated with a "Finish Move WPAR" block 214. Finally, control proceeds to an "End Move WPAR" block 229 in which process 200 is complete.

FIG. 4 is a flowchart of an "Evaluate OSs" process 240. In this example, process 240 is associated with logic stored on CRSM 112 (FIG. 1) in conjunction with WPAR OLM 136 (FIGS. 1 and 2) and may involve communication between WPAR. OLM 136 and WPAR OLM 156 on CS_2 146. Although some information on an OS may be obtained from a query to the OS, the detail is typically not sufficient to support the claimed subject matter. For example, AIX systems provide a "ostype" attribute that indicates the AIX level of the runtime provided to applications.

Process 249 starts in a "Begin Evaluate OSs" block 242 and proceeds immediately to an "Identify Filesets" block 244. During processing associated with block 244, a defined, core group of AIX filesets that are typically installed with an OS, and/or have some impact on the environment are identified within OS_1 124 and OS_3 154 (see 166 and 168.

FIG. 2. During, processing associated with a "Check install Levels" block 246, the filesets identified during processing associated with block 244 are checked to determine their various properties. During processing associated with an "Install Levels (ILs) Match" block 248, a determination is made as to whether or not the filesets in OS_1 124 and OS_3 154 match.

If so, control proceeds to a "Return Match" block 250 and the process that called process 240 (see 206, FIG. 3) is notified that the OSs are the same. If not, control proceeds to a "Correlate to OSs" block 252 during the filesets identified during processing associated with block 244 for each OS are correlated to determine a specific OS level. During processing associated with a "Return OS Levels" block 254, the OS levels determined during processing associated with block 254 are returned to the calling process. Finally, during processing associated with an "End Evaluate OSs" block 259, process 240 is complete.

Figure 5:
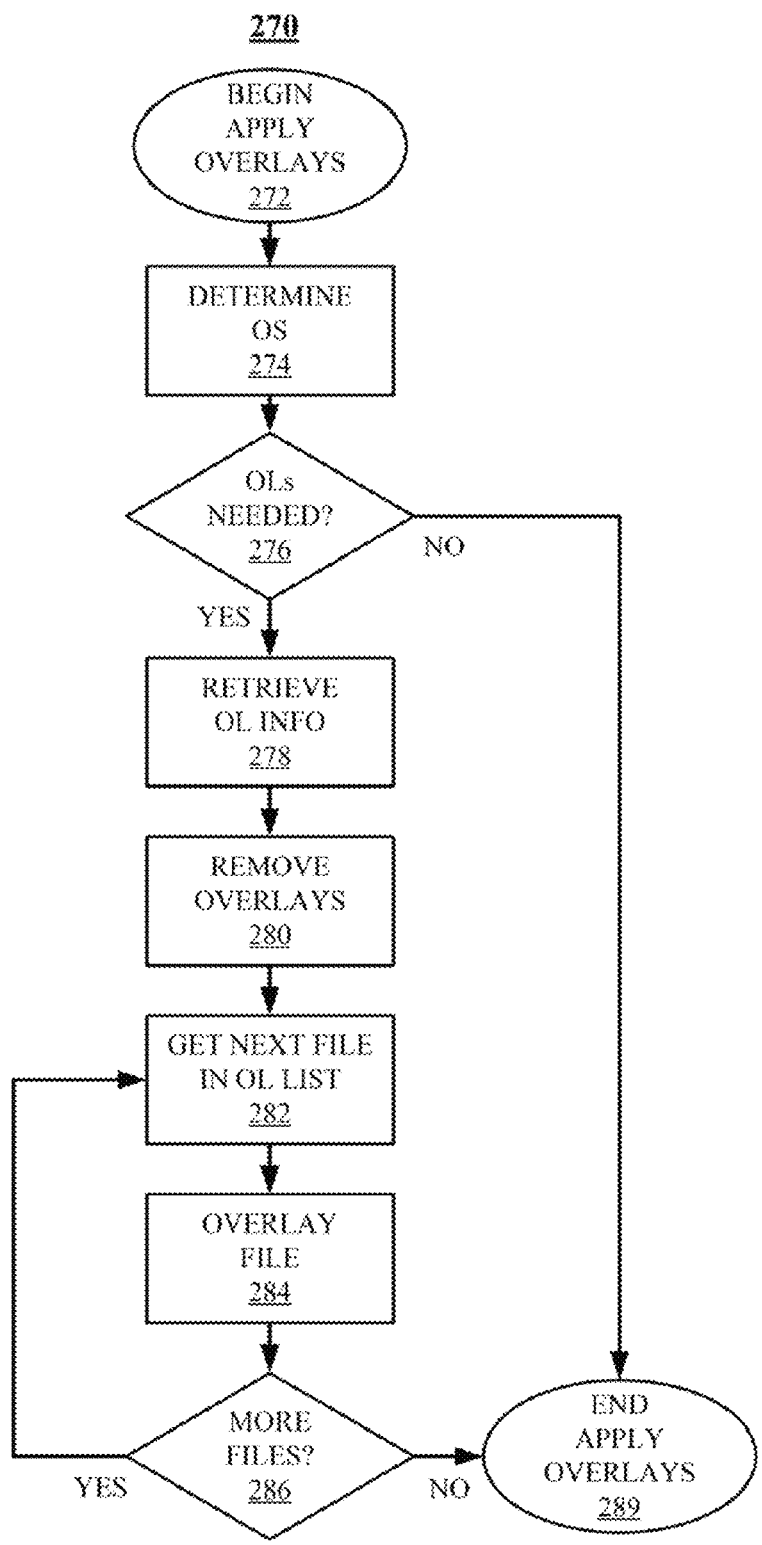
FIG. 5 is a flowchart of an Apply Overlays process that may implement aspects of the claimed subject matter.

FIG. 5 is a flowchart of one example of an "Apply Overlays" process 270 that may implement aspects of the claimed subject matter. Process 270 corresponds to Apply Overlays block 216 (FIG. 3) of Move WPAR process 200 (FIG. 3). Like process 200, in this example, process 270 is associated with logic stored on CRSM_1 111 (FIG. 1) in conjunction with WPAR OLM 136 (FIG. 1) and executed on one or more processors (not shown) of CPU 104 (FIG. 1) of computing system 102 (FIG. 1).

Process 270 begins in a "Begin Apply Overlays" block 272 and proceeds immediately to a "Determine OSs" block 274. During processing associated with block 274, the OS of the arrival LPAR, which in this example is OS_3 154 of LPAR_3 154, is ascertained, typically based upon stored information (see 160, FIG. 2) and information gathered by comparing various fileset levels in OSs 124 and 154 (see 240, FIG. 4). During processing, associated with an "Overlays (OLs) Needed?" block 276 a determination is made as to whether or not overlays are needed for the current move. If so, control proceeds to a "Retrieve OL Info" block 278 during which information that lists the specific overlay required is gathered. Typically, this information is stored in conjunction with WPAR OLM 136 (see 160, 162, 164, 166 and 168, FIG. 2). During processing associated with a "Remove Overlays" block 280, old overlays are removed.

During processing associated with a "Get Next File in OL List" block 282, the name of a file yet to be processed is selected from the OL info retrieved during processing associated with block 278. During processing associated with an "Overlay Files" block 284, the file whose name was selected during processing associated with block 282 is overlaid (see 300, FIG. 6). During processing associated with a "More Files?" block 286, a determination is made as to whether or not there are files listed in the info retrieved during processing associated with block 278 that have yet to be processed. If so, control returns to block 282, the next name in the list is selected and processing continues as described above. If not, or if a determination has been made during processing associated with block 276 that overlays were not needed, control proceeds to an "End Apply Overlays" block 289 during which process 270 is complete.

Figure 6:
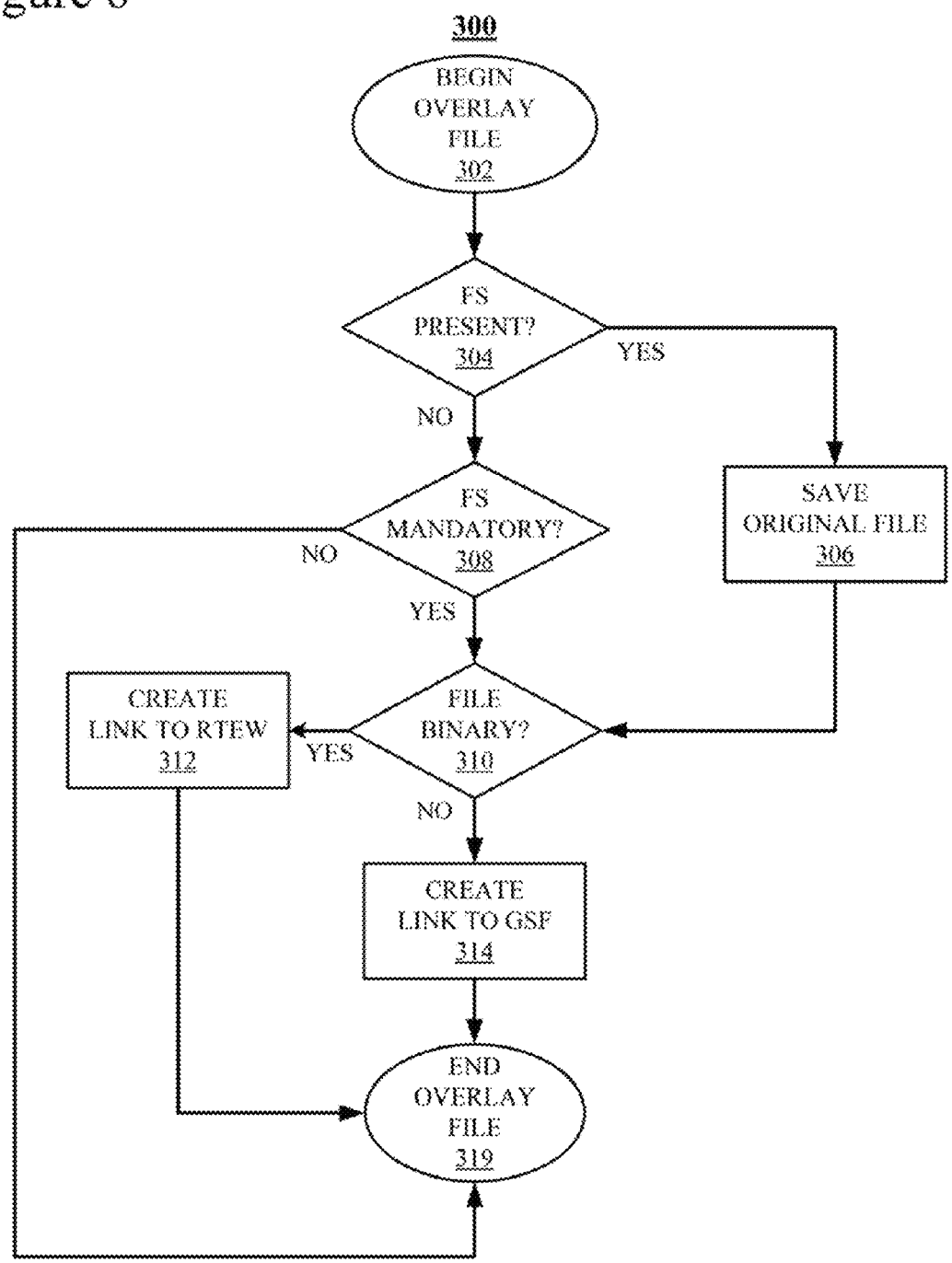
FIG. 6 is a flowchart of one example of an Overlay File process that may implement aspects of the claimed subject matter.

FIG. 6 is a flowchart of one example of an Overlay File process 300 that may implement aspects of the claimed subject matter. Process 300 corresponds to Overlay File block 284 (FIG. 5) of Apply Overlays process 270 (FIG. 5). Like processes 200, 240 and 270, in this example, process 300 is associated with logic, stored on CRSM_1 111 (FIG. 1) in conjunction with WPAR OLM 136 (FIG. 1) and executed on one or more processors (not shown) of CPU 104 (FIG. 1) of computing system 102 (FIG. 1).

Process 300 begins in a "Begin Overlay File" block 302 and proceeds immediately to a "Fileset (FS) Present?" block 304. During processing associated with block 304, a determination is made as to whether or not the file being processed (see 260, FIG. 4) is a member of a fileset that is already present in the WPAR being processed. As explained above, in formation on the files of the WPAR (see 162 and 166, FIG. 2) includes the fileset to which the file belongs. It should also be noted that, although not illustrated in this particular diagram, if a particular file is not present and not part of a mandatory fileset, the file is not needed and therefore no overlay is created.

If the fileset is present, control proceeds to a "Save Original File" block 306. During processing associated with block 306, the file that is already installed is renamed, typically by adding a suffix to the original name. In addition, references to the file in any files that track the file for administrative purposes are also modified to reflect the new name so that, when the original file is to be updated, the original file is updated rather than the file identified by the link. If, during processing associated with block 304 a determination is made that the fileset to which the file belongs is not present, control proceeds to an "FS Mandatory?" block 308. During processing associated with block 308, a determination is made as to whether or not the fileset that was determined not to be present during processing associated with block 304 is a required fileset. If so, or if during processing associated with block 306 the original file has been saved under a new name, control proceeds to a "File Binary?" block 310. During processing associated with block 310, a determination is made as to whether or not the file being processed is binary or not, i.e. a script file. If the file is binary, control proceeds to a "Create Link to Runtime Execution Wrapper (RTEW)" block 312. During processing associated with block 312, a link to the RTEW is generated, having the original name of the file. If a determination is made, during processing associated with block 310, that the file being processed in not binary, then control proceeds to "Create Link to Global Script File (GSF)?" block 314. During processing associated with block 314, a link is created to the corresponding global script file. It should be noted that a script file does not need to employ a RTEW so the link points directly to the corresponding GSF of the native OS.

In addition, if a determination was made during, processing associated with block 304, that the file was not present and during processing associated with block 308 that the file was not mandatory, then the original file did not need to be renamed because the file was not installed. In this manner, files that do not need to be installed and will never be used are not installed and do not consume computing resources.

Once a either link to a RTEW has been created during processing associated with block 312 or a link to a GSF created during block 314, control proceeds to an "End Generate Overlay" block 319 during which process 300 is complete. Files handled in accordance with the disclosed technology eliminate work WPAR OLM 136 would typically need to perform because original files are not installed and thus do not need to be overlaid during updates. Concerns that overlaid files are over-written are also eliminated. In addition, any updates to files in the LPAR_2 132 are automatically applied because the WPAR_1 126 will point to the updated binaries and scripts as soon as they are placed in the LPAR_2 132.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented fir purposes of illustration and description, but is not intended to be exhaustive or limited to the invention in the form disclosed. Many modifications and variations will be apparent to those of ordinary skill in the an without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent as module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   comparing a first fileset associated with a first operating system (OS) with a second fileset associated with a second OS;
   determining, based upon the comparing, that the second OS is a more current version of the first OS;
   in response to the determining that the second OS is a more current version of the first OS, performing a VM move by moving, in conjunction with live application mobility, a virtual machine (VM) workload partition (WPAR) on a first logical partition (LPAR) associated with the first OS to a second LPAR associated with the second OS, the moving comprising:
   determining a set of overlay files associated with the WPAR corresponding to the second OS that are needed for the VM move;
   removing from the WPAR any overlays associated with the first OS;

applying to the WPAR the set of overlay files corresponding to the second OS by:
    determining whether each overlay file of the set of overlay files is a binary overlay file or a non-binary overlay file;
    creating a link to a runtime execution wrapper for each overlay file that is a binary overlay file, and a link to a global script file for each overlay file that is a non-binary overlay file; and
    adding each link to the runtime execution wrapper and each link to the global script file to the WPAR;
check pointing processes associated with the first LPAR by capturing all live data associated with the processes; and
copying the live data associated with the first LPAR from the first LPAR to the second LPAR.

2. The method of claim 1, wherein the first LPAR and the second LPAR are on different computing devices.

3. The method of claim 1, the comparing of the first and second filesets is based upon corresponding filesets associated with each of the first and second OS, respectively.

4. The method of claim 3, wherein each of the corresponding filesets is comprised of a selected set of commonly installed files.

5. The method of claim 1, further comprising restarting the processes associated with the WPAR at a point at which each process was check pointed by using the captured live data associated with the processes.

6. The method of claim 1, the check pointing comprising:
    saving current data associated with each process; and
    pausing each process such that current data may be restored when each process is resumed.

* * * * *